May 7, 1946.  M. M. ITSCOVICH  2,400,047
TIRE
Filed Nov. 15, 1943

INVENTOR
MAXWELL M. ITSCOVICH
BY Brayton Richards
ATTORNEY

Patented May 7, 1946

2,400,047

UNITED STATES PATENT OFFICE 2,400,047

TIRE

Maxwell M. Itscovich, Chicago, Ill.

Application November 15, 1943, Serial No. 510,271

3 Claims. (Cl. 152—311)

The invention relates to improvements in automobile tires and has for its primary object the provision of an improved automobile tire which is non-puncturable and which is of simple construction and highly efficient in use.

Other objects will appear hereinafter.

The invention consists of the combinations and arrangements of parts hereinafter described and claimed.

The invention will be best understood by reference to the accompanying drawing forming a part of this specification and in which—

Figure 1:
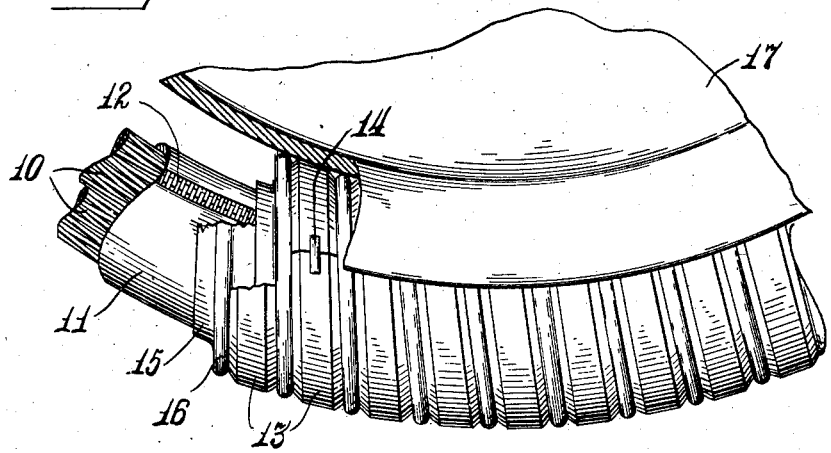
Figure 2:
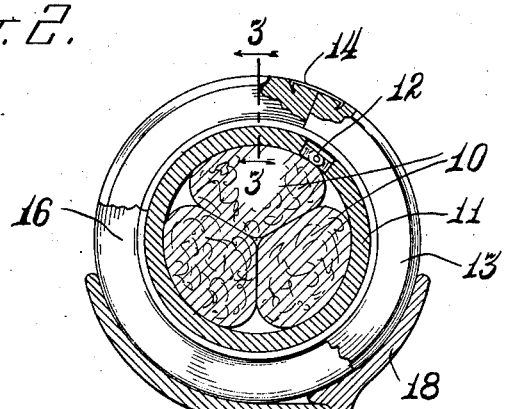

Fig. 1 is a side view of a portion of an automobile tire embodying the invention;

Fig. 2, a transverse section of the same; and

Figure 3:
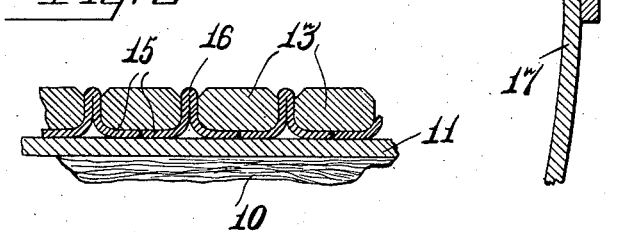

Fig. 3, an enlarged partially detailed section taken substantially on the line 3—3 of Fig. 2.

The embodiment of the invention illustrated in the drawing comprises a central core 10 of manila rope enclosed in a leather sheath 11 having a slide fastening 12 extending throughout its length and whereby the core 10 may be readily inserted and enclosed therein. As will be noted, the sheath thus encloses open spaces between the peripheries of the strands of the rope core and whereby slight freedom of movement between said strands is permitted and dust and dirt excluded therefrom. A tread member 13 consisting of a strip of leather is coiled or wound helically around the sheath 11 as indicated, the ends of said strip being joined together in abutting relationship by means of a staple 14 or the like. A sealing strip 15 of lighter leather is also coiled or wound helically around the sheath 11, under the strip 13, but in staggered relation thereto so as to lie under the cracks or gaps between the coils of the strip 13. The strip 15 is provided with a central ridge 16 projecting, as shown, into the spaces between strip 13 and thus serves as a sealing strip to prevent the ready entry of dust and dirt under the strip 13 and in contact with the sheath 11, thereby minimizing wear therefrom. As illustrated, the tire thus provided may be readily attached to a disc wheel 17 having a split rim 18, as will be readily understood.

In this way a tire is provided which will have sufficient resiliency for the purpose and yet will not be puncturable or subject to blow-outs as the ordinary pneumatic tire.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A tire comprising an annular rope core, a sheath enclosing said core, a flexible sealing strip helically wound about said sheath and having spaced ridges projecting upwardly from the face of the sheath, and a tread member more rigid than said sealing strip wound helically on said strip intermediate said upwardly projecting spaced ridges.

2. A tire comprising an annular rope core enclosed in a leather sheath, a leather sealing strip helically wound about said sheath and having spaced ridges projecting upwardly from the face of the sheath, and a leather tread member wound helically on said sealing strip intermediate said upwardly projecting spaced ridges.

3. A tire comprising an annular core composed of a plurality of strands of rope, a leather sheath enclosing said core, said sheath having a closure and a slidable fastener for said closure whereby the core may be readily inserted within the sheath, a flexible leather sealing strip helically wound about said sheath and having spaced ridges projecting upwardly from the face of the sheath, and a leather tread member more rigid than said sealing strip wound helically on said strip intermediate said upwardly projecting spaced ridges.

MAXWELL M. ITSCOVICH.